(12) United States Patent
Schneider (10) Patent No.: US 8,037,076 B2
(45) Date of Patent: Oct. 11, 2011

(54) FEDERATED INDEXING FROM HASHED PRIMARY KEY SLICES

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 312 days.

(21) Appl. No.: 12/463,553

(22) Filed: May 11, 2009

(65) Prior Publication Data

US 2010/0287171 A1     Nov. 11, 2010

(51) Int. Cl.
*G06F 17/30* (2006.01)
*G06F 7/00* (2006.01)

(52) U.S. Cl. .................. 707/747; 707/711; 707/770

(58) Field of Classification Search .................. 707/711, 707/747, 770
See application file for complete search history.

(56) References Cited

U.S. PATENT DOCUMENTS

| | | | |
|---|---|---|---|
| 6,581,075 | B1 | 6/2003 | Guturu et al. |
| 2003/0084039 | A1* | 5/2003 | Balogh .............. 707/3 |
| 2005/0039036 | A1 | 2/2005 | Eisen |
| 2007/0050429 | A1 | 3/2007 | Goldring et al. |
| 2007/0100808 | A1* | 5/2007 | Balogh .............. 707/3 |
| 2007/0208697 | A1* | 9/2007 | Subramaniam et al. ...... 707/3 |
| 2007/0260575 | A1 | 11/2007 | Robinson et al. |
| 2008/0021908 | A1* | 1/2008 | Trask et al. .......... 707/100 |
| 2009/0106211 | A1* | 4/2009 | Balogh .............. 707/3 |
| 2009/0177610 | A1 | 7/2009 | Kawamura et al. |

OTHER PUBLICATIONS

Risson, John, et al., "Survey of research towards robust peer-to-peer networks: Search methods", Computer Networks, vol. 50, Issue 17, Dec. 5, 2006, pp. 3485-3521.*
Kronfol, Amr Z., "FASD: A Fault-tolerant, Adaptive, Scalable, Distributed Search Engine", Princeton University, May 6, 2002, 58 pages.*
Karger, David, et al., "Consistent Hashing and Random Trees: Distributed Caching Protocols for Relieving Hot Spots on the World Wide Web", STOC '97, El Paso, TX, © 1997, pp. 654-663.*
U.S. Appl. No. 11/809,635, Notice of Allowance dated Oct. 7, 2009, 16 pages.

* cited by examiner

*Primary Examiner* — Robert Stevens
(74) *Attorney, Agent, or Firm* — Lowenstein Sandler PC (57) ABSTRACT

A method and system stores and retrieves data items associated with a primary key, using search indices at multiple storage locations. A server receives a primary key, identifies one or more segments of the primary key, and hashes each segment with one or more hash functions to obtain a sequence of hash values. The hash values are used as keys to index a chain of search indices that are stored in multiple storage locations. One or more of the hash values in the sequence are used to form a host name, and the host name is mapped to an address of a server that stores a first search index in the chain. The last search index in the chain contains the data items associated with the primary key, or provides a reference to one or more locations at which the data items can be found.

20 Claims, 7 Drawing Sheets

FEDERATED INDEXING FROM HASHED PRIMARY KEY SLICES

TECHNICAL FIELD

Embodiments of the present invention relate to data management, and more specifically to a data management system that uses search indices distributed across federated data repositories to conduct a search.

BACKGROUND

A typical data management system includes a front end component and a back end component. The front end component includes one or more client applications (e.g., web browsers and/or special purpose client applications) that generate data request (e.g., read and/or write data items) and transfer these requests to the back end component. The back end component processes the data requests, looks up a search index, and accesses a data repository to store or retrieve the requested data items.

In some enterprise data management systems, a single data repository may not be able to handle all the data items generated by the front end component. Additionally, the search index may contain a large amount of data that cannot be easily managed by a single server. Thus, it becomes crucial to be able to distribute the data items and the search index across multiple storage locations that are managed by multiple servers in an efficient manner.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for storing and retrieving data items associated with a primary key, using search indices at multiple storage locations. In one embodiment, a server receives a primary key that is associated with a plurality of data items. The server identifies one or more segments of the primary key, and hashes each segment with one or more hash functions to obtain a sequence of hash values. The hash values are used as keys to index a chain of search indices that are stored in multiple storage locations. One or more of the hash values in the sequence are used to form a host name, which is mapped to an address of a server that stores a first search index in the chain of search indices. The last hash value in the sequence can be used to identify an entry in a last search index in the chain, where the entry contains the data items associated with the primary key, or provides a reference to one or more locations at which the data items can be found.

One example of a primary key is a uniform resource locator (URL). The information associated with the URL, which may include a collection of documents, graphical objects, images, links, etc., can be collectively referred to as data items. Another example of a primary key is an identifier of a data record. Illustratively, the identifier may be a person's name, or a combination of a person's name and email address. Data items associated with the data record may include home address, job title, and telephone number, etc.

In one embodiment, the data items associated with a primary key may be originally stored in a remote location, such as a remote Web site. To increase the speed of a search engine, the data items can be cached at a local storage location. The tasks of managing, caching and retrieving these data items can be distributed among multiple servers to achieve load balance. Each server can be responsible for the tasks associated with some of the primary keys.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "hashing", "determining", "forming", "obtaining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
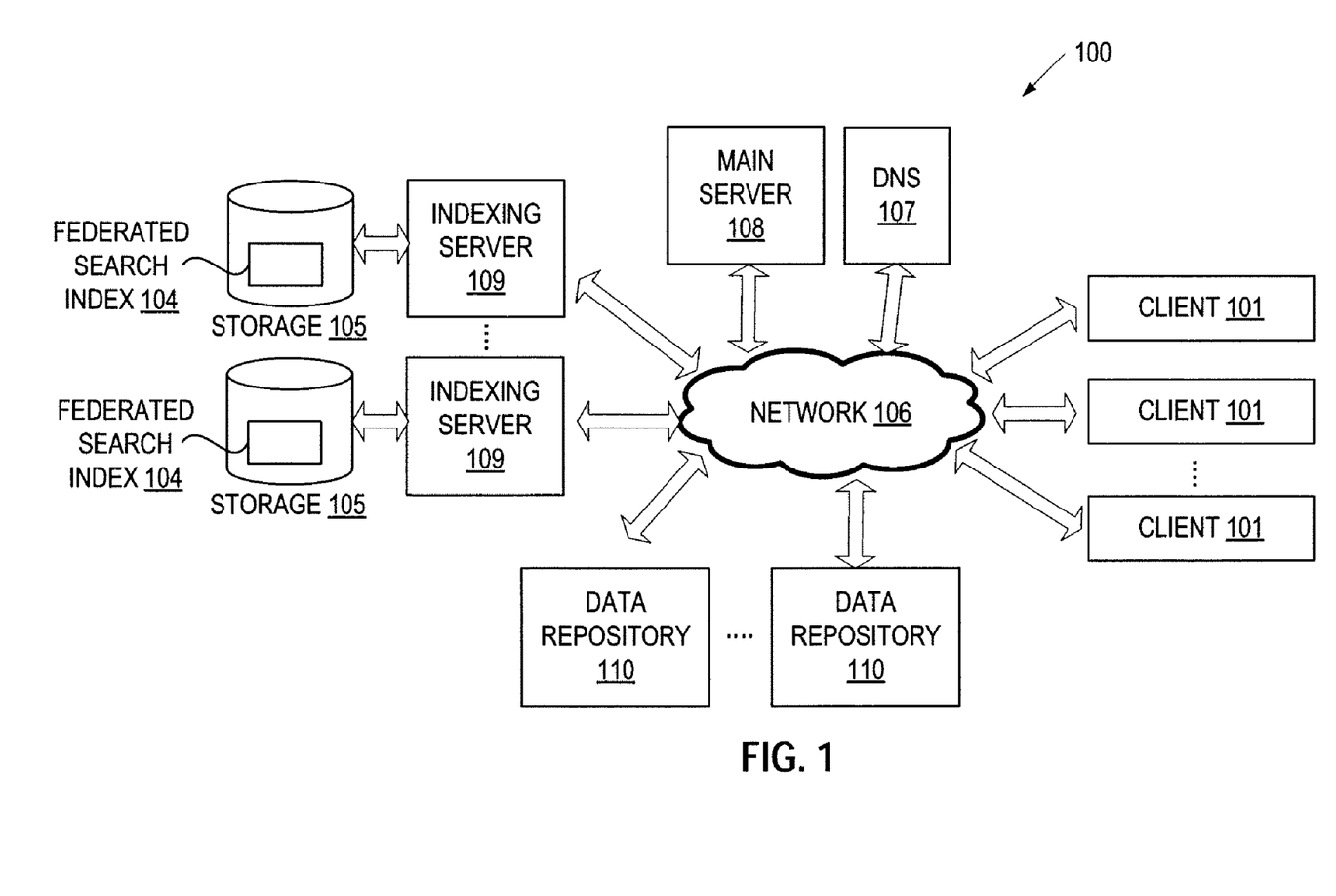
FIG. 1 is a block diagram of an exemplary architecture in which embodiments of the invention may be implemented.

FIG. 1 illustrates an exemplary network architecture 100 in which embodiments of a search engine may operate. The network architecture 100 may include client devices (clients) 101, a main server 108, a plurality of indexing servers 109 and a network 106. The clients 101 may be, for example, personal computers (PCs), mobile phones, palm-sized computing devices, personal digital assistants (PDAs), etc.

The clients 101 are coupled to the main server 108 via the network 106, which may be a public network (e.g., Internet) or a private network (e.g., Ethernet or a local area Network (LAN)). The main server 108 may reside on one or more server machines. The main server 108 serves as a search engine that receives search queries from the clients 101 and uses federated search indices 104 to find data items that satisfy the criteria specified in the search queries. For example, in response to a search query containing a primary key, the main server 108 can point to an indexing server 109, which is linked to a chain of other indexing servers 109. The last indexing server 109 in the chain stores the requested data items, or provides a reference to the location of the requested data items. The primary key can be a URL, an identifier of a data record, or an identifier of other formats of data collections. The primary key can have a fixed or variable length. In one embodiment, the primary key can be partitioned into multiple segments by inherent delimiters (e.g., backslashes in an URL, data fields in a data record, etc.). Alternatively, the primary key may be an alphanumeric string that can be padded and partitioned into segments with each segment having a predetermined length.

In one embodiment, each federated search index 104 is stored in storage 105 coupled to an associated indexing server 109. Alternatively, the federated search index 104 may be stored in the memory of the associated indexing server 109, respectively. The federated search indices 104 can also be collectively referred to as the "search indices." In one embodiment, each search index is a hash table.

The indexing servers 109 are coupled to the main server 108 via the network 106. Each indexing server 109 manages at least one federated search index 104 associated therewith. Each indexing server 109 may reside on one or more server machines. During a document search, the indexing server 109 receives a hash value computed from at least a portion of a primary key, and uses the hash value to locate an entry in its federated search index 104. The entry may point to the location of a next search index 104, store the requested data items, or provide a reference to a location of the requested data items.

The network architecture 100 further comprises data repositories 110 that are coupled to the main server 108 via the network 106. In one embodiment, the data repositories 110 store the data items associated with the primary keys. Each data item in the data repositories 110 can be identified by an identifier, e.g., a URL or an identifier of a data record. The identifier is stored in the search indices 104 in association with each primary key. In one embodiment, the data items in the data repositories 110 can be cached by the indexing servers 109 in the storage 105.

In one embodiment, the network architecture 100 further comprises a domain name server (DNS) 107, which is responsible for mapping a host name to a location (e.g., an address) of the host. As mentioned above, the main server 108 computes hash values from a primary key, and uses one or more of the computed hash values to determine an indexing server 109 that stores a first search index in a chain of search indices 104. The main server 108 may query the DNS 107 to determine the address (e.g., an Internet Protocol (IP) address) of the indexing server 109 at which the first search index is stored. Alternatively, the main server 108 may compute the IP address of the index server directly from the one or more hash values. Although only one DNS 107 is shown, it is understood that any number of DNS's can be used in the network architecture 100 to resolve a host name.

According to one embodiment of the present invention, the network architecture 100 distributes the federated search indices 104 across multiple storage locations, such that the size of each search index 104 is manageable by a single server. The indexing servers 109 and the associated storage 105 can be managed by autonomous and cooperating entities. By "autonomous," it means that the cooperating entities are not necessarily controlled by the same enterprise. For example, multiple independent companies may team up by pooling their resources together to allow document searches in a "federated system" or "federated data repositories." In the embodiment of FIG. 1, a federated system may include the indexing servers 109 and storage 105, which belong to different companies that form an agreement to share their resources for the purpose of performing a search. When the client 101 submits a search request to the main server 108, the main server 108 determines which indexing server 109 to use, and that indexing server 109 looks up the information in its federated search index 104 to determine the next location to search. The clients 101 do not have to be aware of the locations of the federated search indices 104 involved in a search. Instead, the main server 108 provides a unified interface to the clients 102 by performing the necessary computations for the clients 102 to determine the storage locations of the federated search indices 104.

Figure 2:
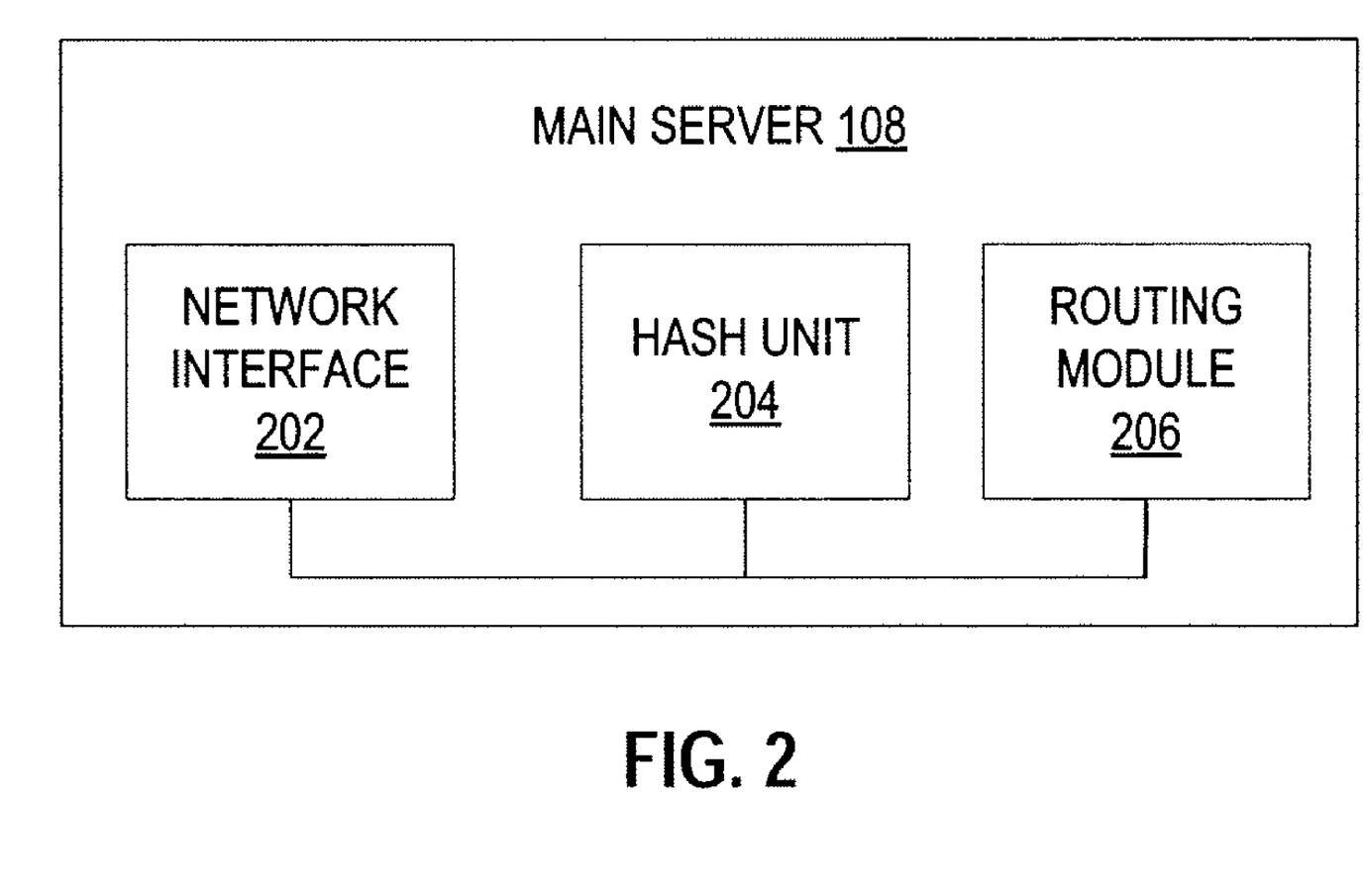
FIG. 2 is a block diagram of one embodiment of a main server.

FIG. 2 is a block diagram of one embodiment of the main server 108. The main server 108 includes a network interface 202, a hash unit 204, and a routing module 206.

In one embodiment, the network interface 202 is responsible for receiving a search request including a primary key from the clients 101, and sending search results to the clients 101 based on the primary key. The network interface 202 is also responsible for communication with the indexing servers 109 and the DNS 107. A primary key contains one or more key segments (also referred to as "segments"). The segments can come from any naturally occurring delimiter (e.g., "/") in the primary key. If the primary key is of a fixed length, the segments can be substrings of the primary key at predetermined locations (e.g., every 8 bits).

The hash unit 204 hashes each segment of the primary key with one or more hash functions to generate a sequence of hash values. The hash values are used as keys to index a chain of search indices. Using the hash values and the search indices, data items associated with the primary key can be found. The routing module 206 is responsible for identifying an index server 109 that stores a first search index in the chain of search indices. In one embodiment, the routing module 206 uses at least some of the computed hash values to determine an identifier (e.g., the name or the address) of the host that stores the first search index. The routing module 206 may also query the DNS 107 to resolve a host name into an IP address. The main server 108, or a different server (not shown), may be responsible for setting up the search indices across different storage locations at an initial setup phase. The operations of main server 108 will be discussed in more detail below with reference to FIGS. 4-6.

The hash unit 204 includes software, hardware, or a combination of both, to perform the hash operations. In one embodiment, each hash function implements a distinct hash algorithm (e.g., Jenkins One-at-a-time hash or SHA-1). Alternatively, each hash function implements the same hash algorithm modulo a different prime number. The hash algorithms are not necessarily cryptographic hashes. In one embodiment, the hash algorithms are chosen to be fast, small, integer hashes that generate hash values of small sizes (e.g., 8-bit values). Limiting the size of hash values reduces the size of each search index, such that each search index can be easily managed by a single server. However, collisions occur when mapping a large collection of primary keys to a small set of hash values. Collisions caused by the use of small hash values can be eliminated or optimized by hashing the same segment of a primary key word multiple times, each time with a different hash function. In one embodiment, the segments of a primary key are not necessarily hashed the same number of times. The key segments that are prone to collisions may be hashed more times than other key segments.

In one embodiment, the chain of search indices points to a server, which can be queried using the entire primary key. The server can be any of the servers shown in FIG. 1 or a different server. In this embodiment, the chain of search indices is used to identify a server that shares the search workload among a plurality of servers participating in load balancing. Thus, the sequence of hash values computed from a primary key does not need to uniquely identify the primary key and its associated data items. Rather, the hash value sequence is used to identify a server to be queried using the primary key. Thus, in this embodiment, multiple primary keys may be mapped into the same hash value sequence and such collisions can be tolerated.

Figure 3:
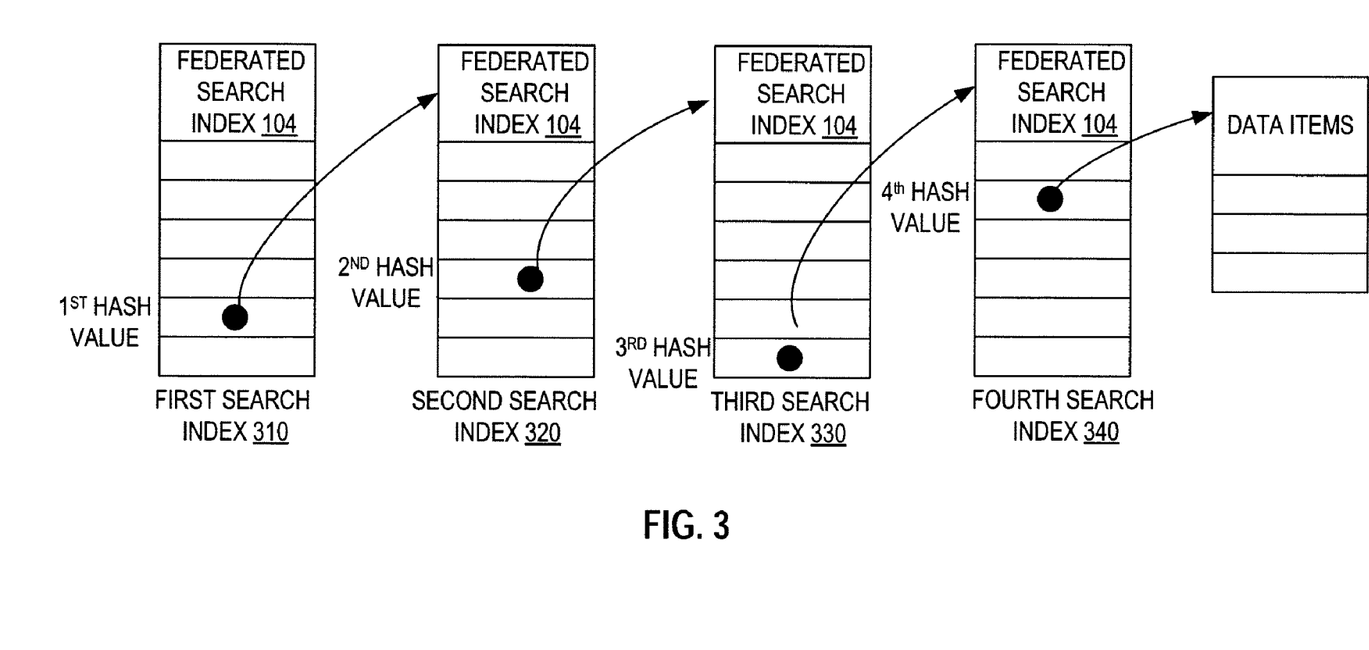
FIG. 3 illustrates an example of a chain of search indices that corresponds to a sequence of hash values in accordance with one embodiment of the invention.

FIG. 3 illustrates an example of forming a chain of search indices using a sequence of hash values. As described above, the main server 108 generates a sequence of hash values from one or more segments a primary key. A primary key can be an identifier of a document, an identifier of a data record, or an identifier of a collection of any information. For simplicity of the description and without loss of generality, the primary key is referred to as being associated with data items. The data items associated with a primary key can include, but are not limited to, one or more documents, images, videos, URL links, graphical objects, data records or data fields, information describing the properties of the documents, images, videos, records, etc., or a combination thereof.

For example, a primary key may be an employee's name for identifying the employee's record. The data items associated with this primary key can be the employee's home address, office address, title, manager, etc. In another example, a primary key may be a URL that is linked to data items such as a collection of documents, images and graphics objects.

Referring to FIG. 3, the first hash value in the sequence (also referred to as the lowest level hash) is used as a key to look up an entry in a first search index 310, where the entry provides a reference to the storage location of a second search index 320. The second hash value is used as a key to look up an entry in the second search index 320, and that entry provides a reference to the storage location of a third search index 330. The third hash value is used as a key to look up an entry in the third search index 330, and that entry provides a reference to the storage location of a fourth search index 340. The fourth hash value in the sequence (also referred to as the highest level hash) is used as a key to look up an entry in the fourth search index 340, and that entry stores the data items associated with the primary key. Alternatively, the entry in the fourth search index 340 may point to a location that stores the data items, or may point to a server that can be queried for the data items using the primary key. Thus, the hash values can be used to index a chain of search indices that are stored in different locations. Generally, the chain is acyclic to avoid indefinite loops during a search. Although four hash values are shown in FIG. 3, it is understood that any number of hash values can be used to form a chain of search indices that are stored in multiple storage locations. Each of the first, second, third and fourth search indices 310-340 can be any one of the federated search indices 104 (FIG. 1).

In some embodiments, the hash values used in the search indices of FIG. 3 are computed from different segments of a primary key. For example, the first two hash values shown in FIG. 3 may be computed from a first segment and the last two hash values may be computed from a second segment. In some embodiments, the levels of hashes for different segments of a primary key are not necessarily the same.

For example, using Jenkins "One-at-a-time" hash, modulo primes 79, 83, 89, and 97, the key segment representing a host name "store1.adobe.com" can be hashed into hash values of (62, 58, 43, 46). A first indexing server will look for entry 62 in the first search index 310, which provides a reference to the second search index 320. The second search index 320 is interrogated for 58, and the result provides another reference to the third search index 330. The third search index 330 is interrogated for 43, and the result provides another reference to the fourth search index 340. The fourth search index 340 is interrogated for 46 to produce a result. The result can be the data items associated with the primary key, a reference to a location that stores the data items, or a pointer to a server that can be queried for the data items using the primary key. Alternatively, the result can be a reference to a next search index that is associated with the next segment of the primary key. As an example, if the primary key is "store1.adobe.com/cfusion", the next key segment can be "cfusion". The process of hashing a segment and using the hash values to locate corresponding search indices can be repeated for all of the segments of a primary key, until the last segment that is hashed. The last hashed segment provides a reference to the requested data items. In one embodiment, the last hashed segment is not necessarily the last segment of the key. For example, the key "http://www.example.com/a/very/long/document/identifier/path" includes segments "www.example.com", "a", "very", "long", "document", "identifier", and "path". In this example, a reference to the document indexed by the key can be returned by the indexing server that handles one of the hash values for intermediate segment, e.g., "a" or "very".

Figure 4:
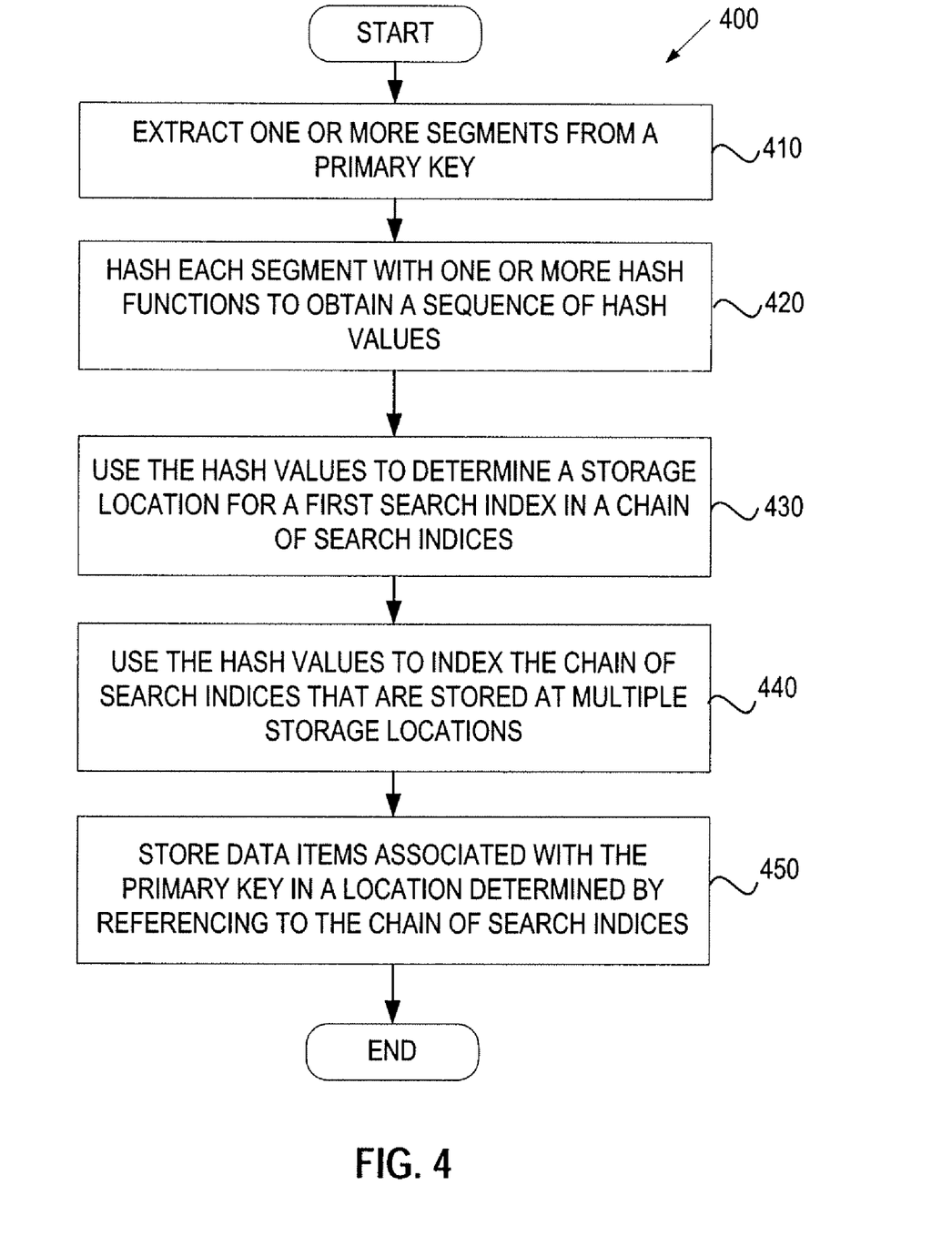
FIG. 4 is a flow diagram of one embodiment of a method for setting up search indices to facilitate retrieval of data items associated with a primary key.

FIG. 4 is a flow diagram illustrating one embodiment of a method 400 for setting up search indices in multiple storages locations, using hash values computed from a primary key. The method 400 may be performed by processing logic 726 of FIG. 7 that may comprise hardware (e.g., circuitry, dedicated logic, programmable logic, microcode, etc.), software (e.g., instructions run on a processing device to perform hardware simulation), or a combination thereof. In one embodiment, the method 400 is performed by the main server 108 of FIG. 1.

Referring to FIG. 4, the method 400 begins with the processing logic 726 extracting segments of a primary key and identifying the data items associated with the primary key (block 410). For each key segment, the processing logic 726 hashes the key segment with one or more hash functions to generate a sequence of hash values (block 420). For example, using Jenkins "One-at-a-time" hash, modulo primes 79, 83, 89, and 97, the key segment representing a host name "www.adobe.com" can be hashed into hash values (21, 36, 57, 9). Similarly, the host name "www.redhat.com" can be hashed into hash values (21, 70, 30, 55). For a primary key that includes multiple key segments, such as "www.redhat.com/wapps/store/catalog.html", each of the key segments can be hashed by the same or different hash functions to produce a sequence of hash values. In another example, the primary key may be the name and street address of a personal record, with the name being one key segment and street address being another key segment. The hash values computed from the name and the street address can form a sequence of hash values for locating the data items relating to the personal record.

Subsequently, using the computed hash values, the processing logic 726 determines the location of the first search index in the chain (block 430). One example for determining the location of the first search index is provided later with reference to FIG. 6. After the location of the first search index is determined, the sequence of hash values is used to index the chain of search indices that are stored at multiple storage locations (e.g., as shown in FIG. 3), such that the lookup result for the nth hash value provides the location to search for the (n+1)th hash value (block 440). The last search index in the chain contains an entry pointed to by the last hash value in the sequence (block 450). The data items can be stored in the entry of the last search index, or in a storage location referenced by the entry. Alternatively, the entry may point to the name or address of a host, which can be queried for the data items using the primary key. The processing logic 726 then stores the data items in the location that is determined by referencing the chain of search indices (block 450).

Figure 5:
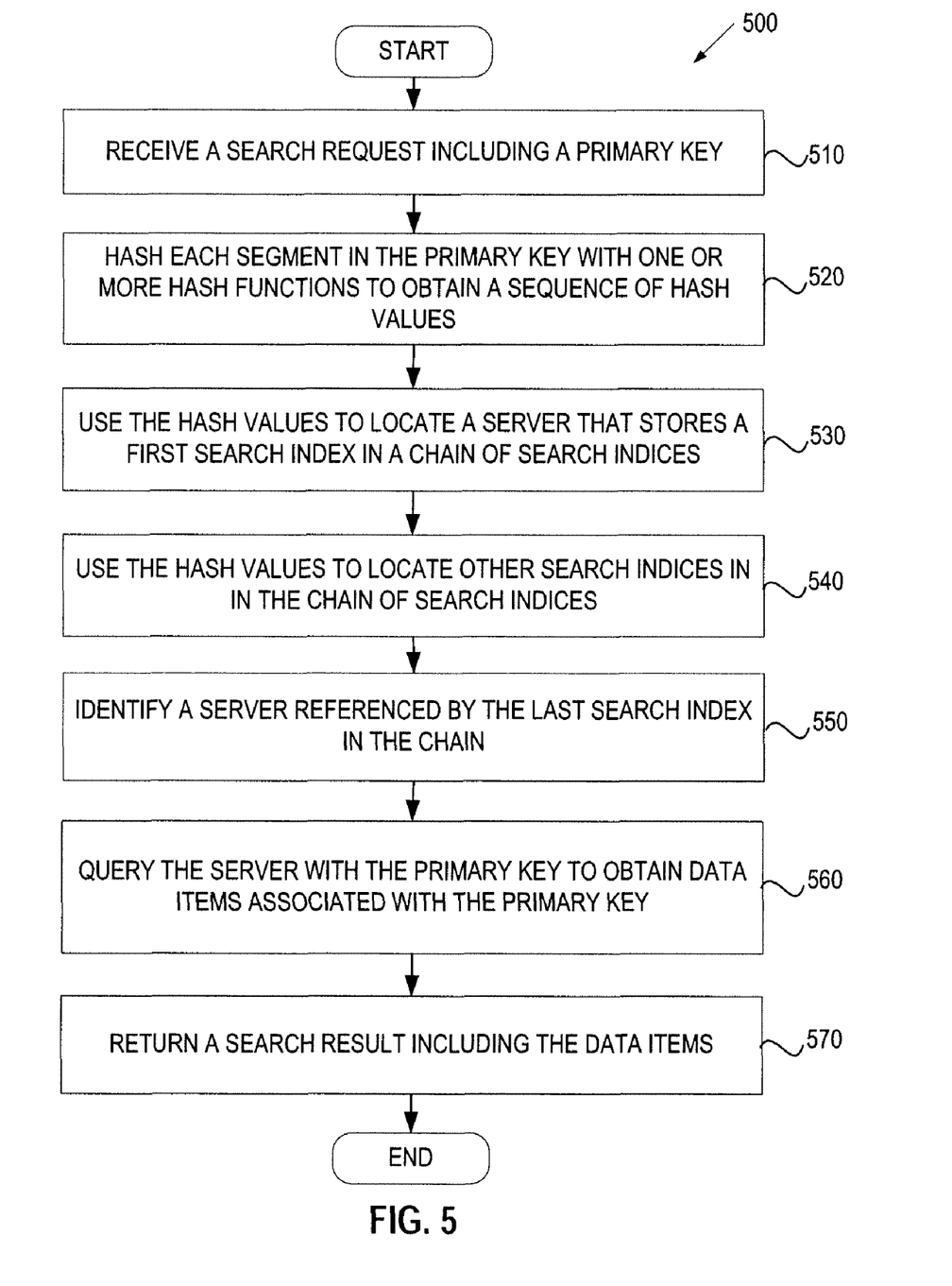
FIG. 5 is a flow diagram of one embodiment of a method for performing a search using the search indices that are set up in FIG. 4.

FIG. 5 is a flow diagram of one embodiment of a method 500 for performing a search in response to a search request that includes a primary key. The method 500 may be performed by processing logic 726 of FIG. 7 that may comprise hardware (e.g., circuitry, dedicated logic, programmable logic, microcode, etc.), software (e.g., instructions run on a processing device to perform hardware simulation), or a combination thereof. In one embodiment, the method 500 is performed by the main server 108 and the indexing servers 109 of FIG. 1.

Referring to FIG. 5, the method 500 begins with the processing logic 726 receiving a search request including a primary key (block 510). The search request may ask the main server 108 to identify the data items associated with the primary key. For each segment in the primary key, the processing logic 726 hashes the segment with one or more hash functions to generate a sequence of hash values (block 520). These hash functions are identical to the hash functions used during the setup phrase of FIG. 4. The hash values are used as keys to index a chain of search indices that are stored at multiple locations. The processing logic 726 uses one or more of the hash values in the sequence to locate a server that stores the first search index in the chain (block 530). One example for determining the location of the first search index is provided later with reference to FIG. 6. After the first search index is located in a server ("a first server"), the first server uses the first hash value to find an entry in the first search index, where the entry provides a reference to the server ("a second server") that stores the second search index. That is, the nth hash value is used to locate the server that stores the (n+1)th search index in the chain (block 540). In one embodiment, the last hash value and the last search index in the chain provide a reference to a server (block 550). The processing logic 726 then queries the server using the primary key to obtain the data items associated with the primary key (block 560). The data items may be stored in one or more of the data repositories 110 of FIG. 1. In alternative embodiments, the last search index may store the data items in an entry pointed to by the last hash value, or may store a pointer to a storage location in the entry of the last search index. A search result including the data items is then returned to the client that sends the search request (block 570).

At block 530 above, a number of schemes can be used to locate the first server that stores the first search index in the chain. One scheme is to incorporate one or more of the hash values computed from the primary key into the host name of the first server. The host name can be mapped to an IP address of the first server using a mapping table stored in the main server 108 or in the DNS 107. For example, the name of the first server can be "indexserver-$x-$y.example.com", where $x and $y are the first and second hash values, respectively. In the example of "www.redhat.com" with corresponding hash values (21, 70, 30, 55), the name of the first server can be indexserver-21-70.example.com, which can be resolved into an IP address by the main server 108 or the DNS 107.

The number of hash values used in the host name can be chosen such that it is a reasonable compromise between spreading out the name space and overwhelming the DNS. For example, the combination of two hash values $x and $y, each in the range 0-255, generates different 65,535 host names that can be mapped to 65,535 or fewer IP addresses. The 65,535 host names need 65,535 entries to accommodate all of them. Using more hash values in the host name can spread out the address space to which the host name can be mapped, but will also increase the number of DNS entries that a DNS needs to manage.

Another less flexible, but faster, scheme is to use one of the hash values as part of an IP address of the first server. In this scheme, a divisor is chosen to divide the hash value computed from a segment of a primary key, with the divisor value being close to the size of the piece of the IP address to be replaced. A natural choice for the piece of the IP address is a single octet, that is, a number in the range of 0 and 255. Since IP addresses that end in 0.0 or 0.255 are reserved for network functions and are thus unavailable, and 0.1 is conventionally used for routing, any number in the range of 2-253 can work. Illustratively, the number 251 can be chosen as 251 is a prime number, which means it is virtually guaranteed to be co-prime with the size of the range of the hash function. In one embodiment, the set of divisors for a given hash value are chosen such that they are co-prime with each other, and preferably are also co-prime with the size of the range of the hash function. Using divisors that are not co-prime may result in sets of remainders that are strongly correlated.

If the final octet of the IP address is to be replaced, the result can be biased by 2 to produce a value of the octet from 2 to 252. The bias is performed to avoid a value of 0 or 1 in the final octet of a network address, as 0 and 1 are typically reserved for particular network functions. For example, host names store1.adobe.com, www.redhat.com, and www.adobe.com are hashed using the Jenkins "One-at a time" hash to produce the values 109331559, 928514513, and 3959819563, respectively. Dividing these values by 251 produces remainders of 226, 2, and 140, respectively. Adding 2 to each of the remainders produces the biased hash values of 228, 142, and 4, respectively. If the indexing servers are set up to be 172.31.251.0/24, the IP addresses of the first server storing the first search index will be 172.31.251.228, 172.31.251.142, and 172.31.251.4, respectively. In the address "172.31.251.0/24", the "/24" part of the address indicates that this is a network address, where the first 24 bits are significant (in this case, "172.31.251"). Equivalently, "172.31.251.0/24" indicates all the IP addresses in the range 172.31.251.0 to 172.31.251.255.

The above scheme of using direct IP addresses for the first server that stores the first search index is potentially faster because it does not need a host name lookup before accessing the indexing servers. However, the scheme does not lend itself well to fail-proof clustering. That is, if the first server fails, it can take a non-negligible amount of time before another server can be set up to have the same IP address as the failed server.

Another scheme that takes advantage of the federated nature of a DNS system is described below. The scheme constructs a host name using some or all of the computed hash values in a reversed order. For example, if a primary key produces a first hash of 15, a second hash of 34, a third hash of 8, etc., a host name of 8.34.15.indexserver.example.com can be constructed. A recursive DNS query can be relied on to produce the location of the 15, 34, 8 table. One way to manage the recursive DNS query is for the DNS server for "example.com" to delegate lookups in "indexserver.example.com" to another server, which delegates "15.indexserver.example.com" lookups, which delegates "34.15.indexserver.example.com" lookups. The ordering of the hash values (first hash farthest to the right) is designed to take advantage of this delegation; the functional module performing the lookups can query "15.indexserver.example.com", "34.15.indexserver.example.com", "8.34.15.indexserver.example.com", etc., stopping at the point where an address is returned. A method of the lookup process is described as follows with reference to FIG. 6.

Figure 6:
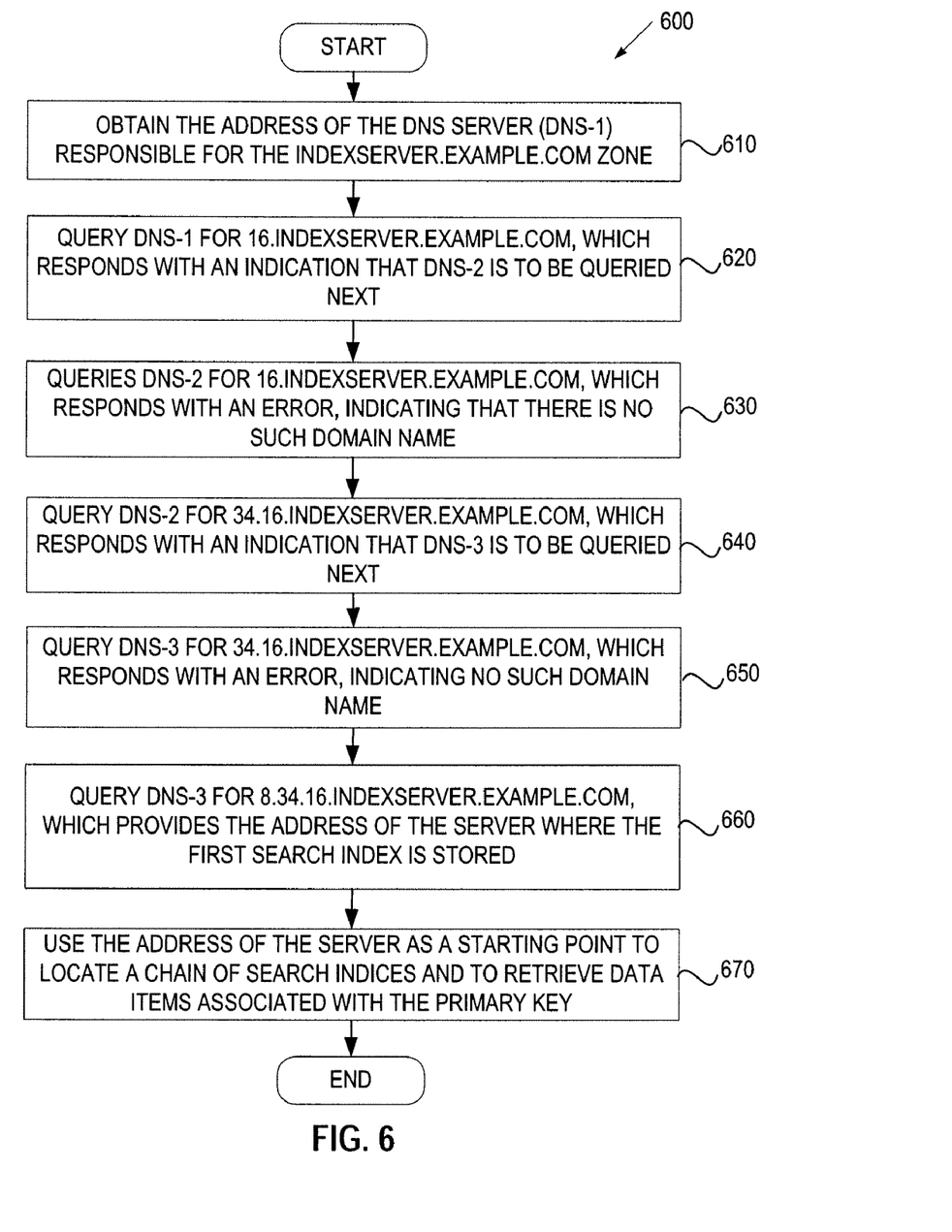
FIG. 6 illustrates an example of using hash values computed from a primary key to determine the location of a server at which a first search index in the chain is stored.

FIG. 6 is a flow diagram of one embodiment of a method 600 for performing an address lookup to locate the server where the first search index in an index chain is stored. As an example, the method 600 is used to find the location for the primary key with the successive hashes (15, 34, 8, . . . ). The method 600 may be performed by processing logic 726 of FIG. 7 that may comprise hardware (e.g., circuitry, dedicated logic, programmable logic, microcode, etc.), software (e.g., instructions run on a processing device to perform hardware simulation), or a combination thereof. In one embodiment, the method 600 is performed by the routing module 206 of the main server 108 shown in FIG. 2.

Referring to FIG. 6, the method 600 begins with the processing logic 726 obtaining the address of the DNS server responsible for the indexserver.example.com zone (referred to as DNS-1) (block 610). The processing logic 726 queries DNS-1 for 15.indexserver.example.com, which responds with an indication that the 15.indexserver.example.com zone is the responsibility of DNS-2 (block 620). As a result, DNS-2 is to be queried next. The processing logic 726 then queries DNS-2 for 15.indexserver.example.com, which responds with an error, indicating that there is no such domain name (block 630).

Thereafter, the processing logic 726 queries DNS-2 for 34.15.indexserver.example.com, which responds with an indication that DNS-3 is to be queried next (block 640). The processing logic 726 then queries DNS-3 for 34.15.indexserver.example.com, which responds with an error, indicating no such domain name (block 650).

Subsequently, the processing logic 726 queries DNS-3 for 8.34.15.indexserver.example.com, which provides the address of the indexing server 109 where the first search index in the chain is stored (block 660). The processing logic 726 then uses the address as a starting point to locate the chain of search indices, and uses the search indices to retrieve the data items associated with the primary key (block 670).

The method 600 allows the network administrators responsible for the index server search space to decide how much load to place on the DNS system and on the indexing servers. At one extreme, if the data items associated with the primary key is reasonably small, the data items can be stored in the DNS system itself as a DNS comment record.

Figure 7:
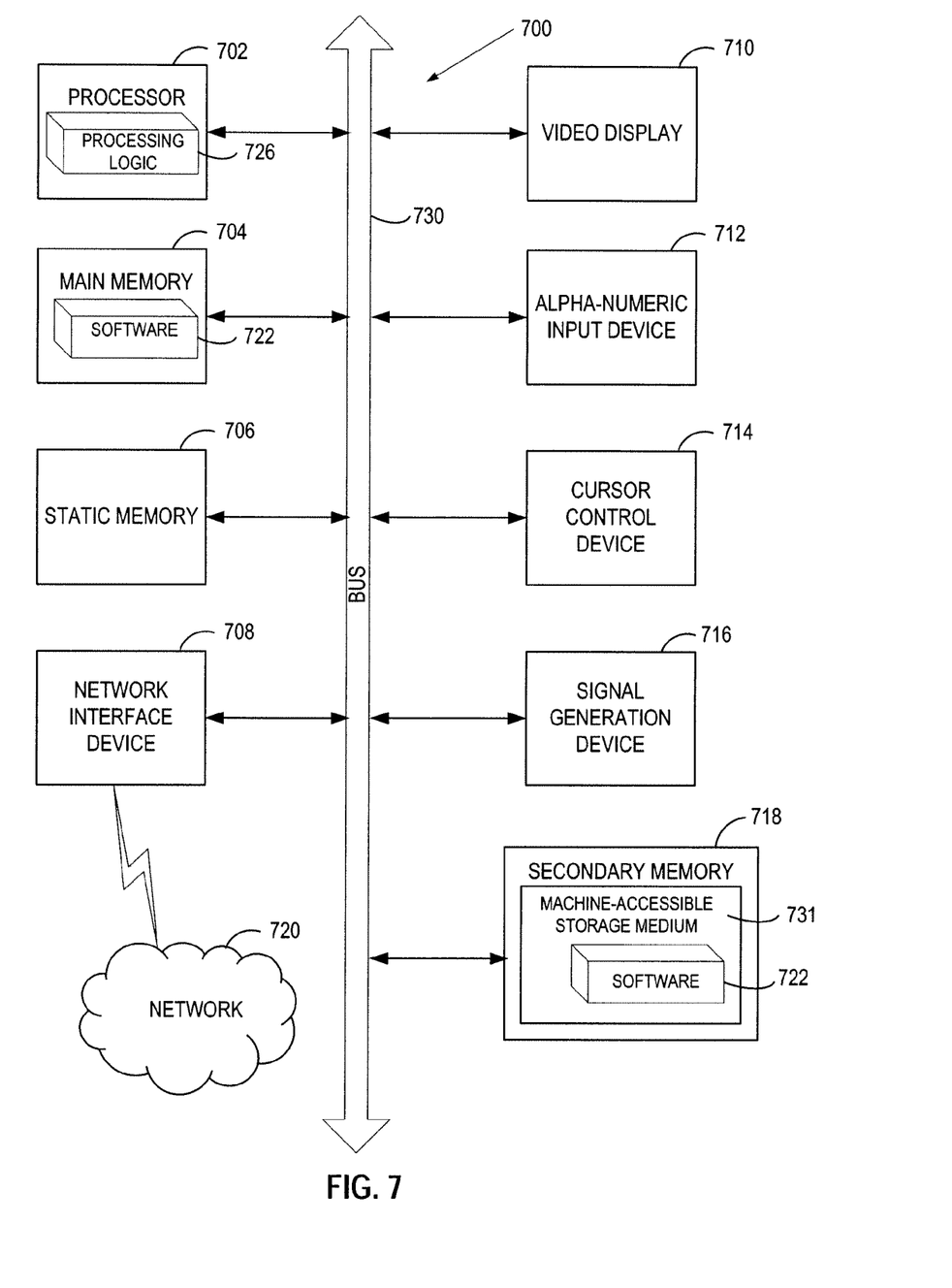
FIG. 7 illustrates a diagrammatic representation of a machine in the exemplary form of a computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 718 (e.g., a data storage device), which communicate with each other via a bus 730.

The processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The secondary memory 718 may include a machine-readable storage medium (or more specifically a computer-readable storage medium) 731 on which is stored one or more sets of instructions (e.g., software 722) embodying any one or more of the methodologies or functions described herein. The software 722 may also reside, completely or at least partially, within the main memory 704 and/or within the processing device 702 during execution thereof by the computer system 700; the main memory 704 and the processing device 702 also constituting machine-readable storage media. The software 722 may further be transmitted or received over a network 720 via the network interface device 708.

The machine-readable storage medium 731 may also be used to store the federated search indices 104 (FIG. 1). While the machine-readable storage medium 731 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method, comprising:
    receiving, by a computer system, a primary key associated with a plurality of data items, the primary key including a plurality of segments;
    hashing, by the computer system, each segment with one or more hash functions to obtain a sequence of hash values; and
    determining, by the computer system, one or more storage locations of the data items using a chain of search indices that uses the sequence of hash values as keys.

2. The method of claim 1, further comprising:
    forming, with a predetermined number of the hash values in the sequence, a name of a host that stores a first search index in the chain; and
    obtaining an address of the host from a domain name server (DNS) using the name of the host.

3. The method of claim 1, further comprising:
    forming a name of a host that stores a first search index in the chain, the name including a predetermined number of the hash values in an order that a first hash value in the sequence being farthest right in the name; and
    performing a recursive DNS query that uses the hash values from right to left in the name to obtain an address of the host.

4. The method of claim 1, further comprising:
    mapping a predetermined number of the hash values in the sequence to an Internet Protocol (IP) address of a host that stores a first search index in the chain.

5. The method of claim 1, further comprising:
    querying a server referenced by a last search index in the chain using the primary key to obtain the data items.

6. The method of claim 1, further comprising:
    obtaining the data items from a last search index in the chain.

7. The method of claim 1, wherein receiving a primary key further comprises:
    identifying the segments as separated by a delimiter or as fix-length data segments.

8. The method of claim 1, further comprising:
    using each hash value in the sequence as a key to index one of the chain of search indices that are stored across multiple locations.

9. A computer readable storage medium including instructions that, when executed by a processing system, cause the processing system to perform a method comprising:
    receiving a primary key associated with a plurality of data items, the primary key including a plurality of segments;
    hashing each segment with one or more hash functions to obtain a sequence of hash values; and
    determining one or more storage locations of the data items using a chain of search indices that uses the sequence of hash values as keys.

10. The computer readable storage medium of claim 9, further comprising:
    forming, with a predetermined number of the hash values in the sequence, a name of a host that stores a first search index in the chain; and
    obtaining an address of the host from a domain name server (DNS) using the name of the host.

11. The computer readable storage medium of claim 9, further comprising:
    forming a name of a host that stores a first search index in the chain, the name including a predetermined number of the hash values in an order that a first hash value in the sequence being farthest right in the name; and
    performing a recursive DNS query that uses the hash values from right to left in the name to obtain an address of the host.

12. The computer readable storage medium of claim 9, further comprising:
    mapping a predetermined number of the hash values in the sequence to an Internet Protocol (IP) address of a host that stores a first search index in the chain.

13. The computer readable storage medium of claim 9, further comprising:
    querying a server referenced by a last search index in the chain using the primary key to obtain the data items.

14. The computer readable storage medium of claim 9, further comprising:
    obtaining the data items from a last search index in the chain.

15. The computer readable storage medium of claim 9, wherein receiving a primary key further comprises:
    identifying the segments as separated by a delimiter or as fix-length data segments.

16. The computer readable storage medium of claim 9, further comprising:
    using each hash value in the sequence as a key to index one of the chain of search indices that are stored across multiple locations.

17. A system comprising:
    a network;
    data storage coupled to the network to store a search index; and
    an indexing server coupled to the data storage to receive at least one hash value in a sequence of hash values that are obtained from hashing one or more segments of a primary key with one or more hash functions, and to use the at least one hash value as a key to the search index to cause a location of one or more data items associated with the primary key to be determined.

18. The system of claim 17, further comprising:
    a main server coupled to the network to hash the segments of a primary key with one or more hash functions to obtain the sequence of hash values; and
    a routing module coupled to the main server to use a predetermined number of the hash values in the sequence to identify a name of one of a plurality of indexing servers that holds a first search index in a chain of search indices stored across multiple locations.

19. The system of claim 17, further comprising:
    a main server coupled to the network to hash the segments of a primary key with one or more hash functions to obtain the sequence of hash values; and
    a routing module coupled to the main server to use a predetermined number of the hash values in the sequence to identify an Internet Protocol (IP) address of one of a plurality of indexing servers that holds a first search index in a chain of search indices stored across multiple locations.

20. The system of claim 17, further comprising:
    one or more domain name servers coupled to the network to receive a name of a host and to return an address of the host, the host being one of a plurality of indexing servers that holds a first search index in a chain of search indices stored across multiple locations.

* * * * *